United States Patent [19]
Matui

[11] 3,819,255
[45] June 25, 1974

[54] EYE-LEVEL AND WAIST-LEVEL VIEWFINDER
[75] Inventor: Sei Matui, Kawasaki, Japan
[73] Assignee: Nippon Kogaku K.K., Tokyo, Japan
[22] Filed: June 12, 1973
[21] Appl. No.: 369,315

[30] Foreign Application Priority Data
June 19, 1972 Japan.............. 47-60467

[52] U.S. Cl............. 88/1.5 R, 95/11 V, 350/286
[51] Int. Cl............................. G03b 13/02
[58] Field of Search......... 88/1.5 R; 95/11 V, 42; 350/286, 287

[56] References Cited
UNITED STATES PATENTS
| | | | |
|---|---|---|---|
| 3,590,683 | 7/1971 | Hiruma | 88/1.5 R |
| 3,651,735 | 3/1972 | Hiruma | 88/1.5 R |

FOREIGN PATENTS OR APPLICATIONS
| | | | |
|---|---|---|---|
| 741,844 | 11/1943 | Germany | 95/42 |
| 166,197 | 6/1950 | Austria | 88/1.5 R |
| 1,002,614 | 2/1957 | Germany | 95/42 |
| 208,251 | 5/1957 | Australia | 88/1.5 R |
| 58,001 | 9/1967 | Germany | 95/42 |

Primary Examiner—John K. Corbin
Assistant Examiner—F. L. Evans
Attorney, Agent, or Firm—Shapiro and Shapiro

[57] ABSTRACT

A pentagonal dach prism is divided into two prisms by providing two dividing surfaces between the first and second reflecting surfaces of the pentagonal dach prism. The angles between the first dividing surface and the surface of incidence, between the first reflecting surface and the surface of incidence, between the second reflecting surface and the surface of incidence, and between the surface of emergence and the surface of incidence, are selected to satisfy certain relationships. The second prism is rotatatively displaceable through 180° about a principal optical axis passing from the first to the second prism. A viewfinder employing such pentagonal dach prism may be selectively used as an eye-level viewfinder and as a waist-level viewfinder.

4 Claims, 4 Drawing Figures

3,819,255
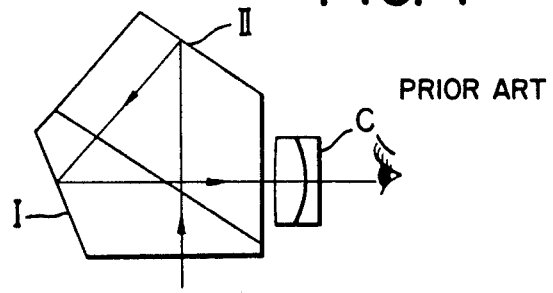
FIG. 1
PRIOR ART
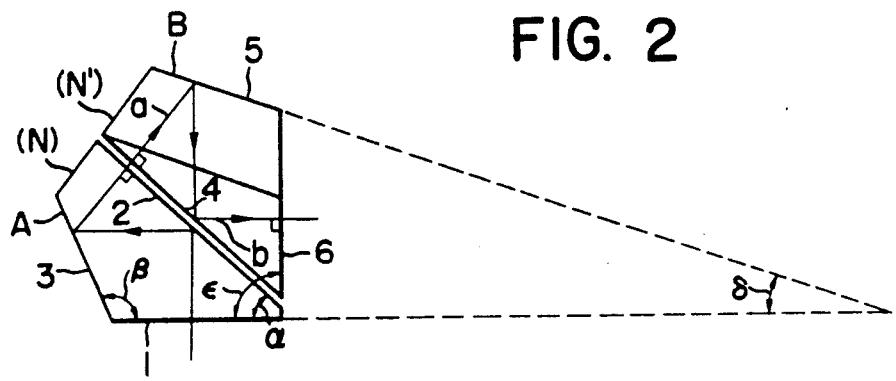
FIG. 2
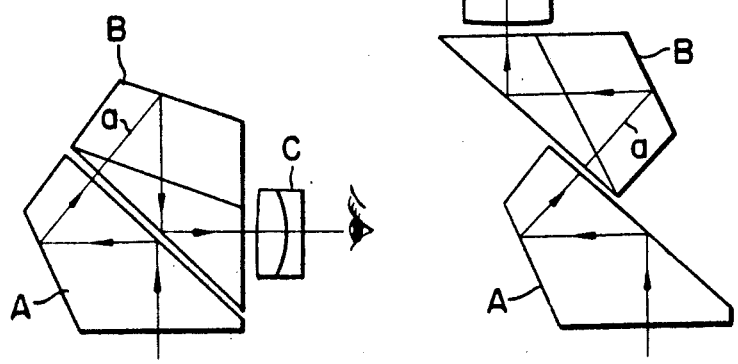
FIG. 3(A)
FIG. 3(B)

EYE-LEVEL AND WAIST-LEVEL VIEWFINDER

BACKGROUND OF THE INVENTION

1. Field of the Invention

This invention relates to an eye-level and waist-level viewfinder.

2. Description of the Prior Art

In single-lens reflex cameras, the eye-level viewfinder through which an object image may be viewed as a vertically and horizontally normal image has most usually employed a pentagonal dach prism or mirror. A pentagonal dach prism, however, has not been usable in a waist-level fashion as in a two-lens reflex camera. Thus, the use of pentagonal dach prisms has heretofore been limited to eye-level viewfinders.

SUMMARY OF THE INVENTION

The present invention has, for its object, to provide a viewfinder suitable for use at both eye-level and waist-level by forming dividing surfaces between the first and second reflecting surfaces of a conventional pentagonal dach prism to thereby divide the prism into two sub-prisms.

According to the present invention, the pentagonal dach prism which is formed to provide an eye-level and waist-level viewfinder, is divided into a first and a second prism by providing a first and a second dividing surface between a first and a second reflecting surface of the pentagonal dach prism. The pentagonal dach prism is designed so as to satisfy four predetermined relations which will be described hereinafter. The second prism obtained by the division is arranged for rotation through 180° about a principal optical axis passing from the first prism to the second prism or substantially about such axis.

The invention will become more fully apparent from the following detailed description thereof taken in conjunction with the accompanying drawings.

BRIEF DESCRIPTION OF THE DRAWINGS

FIG. 1 schematically shows an eye-level viewfinder system employing a conventional pentagonal dach prism and the path of principal optical axes in such prism;

FIG. 2 schematically illustrates the pentagonal dach prism divided into two prisms according to the present invention;

FIG. 3A schematically shows an eye-level viewfinder employing the pentagonal dach prism of the present invention and the path of principal optical axes therein; and FIG. 3B shows the viewfinder of FIG. 3A as converted to a waist-level viewfinder and the path of principal optical axes therein.

DESCRIPTION OF THE PREFERRED EMBODIMENTS

FIG. 1 shows an eye-level viewfinder employing a conventional pentagonal dach prism. According to the present invention, such pentagonal dach prism may be divided into two prisms by providing dividing surfaces between or intermediate the first and second reflecting surfaces I and II of the pentagonal dach prism to furnish eye-level and waist-level viewfinder. C designates an eyepiece.

The principles of the present invention will now be described with reference to FIG. 2. There is shown a surface of incidence 1, dividing surfaces 2 and 4, a reflecting surface 3, a dach surface 5, and a surface of emergence 6. The dividing surface 2 and the surface of incidence 1 form an angle $\alpha$ therebetween; the reflecting surface 3 forms an angle $\beta$ with the surface of incidence 1; the dach surface 5 forms an angle $\delta$ with the surface of incidence 1; and the surface of emergence 6 forms an angle $\epsilon$ with the surface of incidence 1. Letter $a$ designates a principal optical axis passing from the reflecting surface 3 to the dach surface 5, and $b$ a principal optical axis passing from the dividing surface 4 to the surface of emergence 6. N and N' designate the refractive indices of prisms A and B, respectively.

Light enters the surface of incidence 1 and is totally reflected by the dividing surface 2 toward the reflecting surface 3, which in turn reflects the light to direct it through the dividing surfaces 2 and 4 to the dach surface 5 along or substantially along the principal optical axis $a$, which is made perpendicular to the dividing surfaces 2 and 4 by suitably selecting the angles $\alpha$ and $\beta$. The light is now reflected by the dach surface 5 and travels to the dividing surface 4, which causes the light to be totally reflected and passed through the surface of emergence 6 along or substantially along the principal optical axis $b$ which is made perpendicular to the surface of emergence 6 by certain relations among the angles $\alpha$, $\delta$ and $\epsilon$. With such construction, the device may be converted from an eyelevel mode to a waist-level mode by rotating the prism B through 180° about or substantially about the principal axis $a$ from the position shown in FIG. 3A to the position shown in FIG. 3B. It will be apparent that converting the viewfinder back to eye-level mode involves simply reverse rotation of prism B to the position shown in FIG. 3A.

Conditions under which these results are possible will be described hereunder. In order that the light beam passed through the surface of incidence 1 may be totally reflected by the dividing surface 2, the angle $\alpha$ must satisfy the relation:

$$\sin \alpha > 1/N \quad (1)$$

(For a critical angle $\alpha c$, $\sin \alpha c = 1/N$)

In order that the principal optical axis $a$ passing from the reflecting surface 3 to the dach surface 5 may be perpendicular to the dividing surfaces 2 and 4, the angles $\alpha$ and $\beta$ must be selected to satisfy the relation:

$$\beta = 180° - 3\alpha/2 \quad (2)$$

If condition (2) is not satisfied, the principal axis $a$ cannot be perpendicular to the dividing surface 4. This inturn means that it is not feasible to convert eye-level to waist-level viewing and vice-versa by rotating the prism B about the axis $a$.

Next, in order that the light beam reflected by the dach surface 5 may be totally reflected by the dividing surface 4, and since the critical angle $\sin \{2 (\alpha - \delta)\}c = 1/N$, the angles $\alpha$ and $\delta$ must satisfy the relation:

$$\sin 2 (\alpha - \delta) > 1/N, \quad (3)$$

Further, in order that the principal optical axis $b$ for the light beam totally reflected by the dividing surface 4 may be perpendicular to the surface of emergence 6, the angles $\alpha$, $\delta$ and $\epsilon$ must satisfy the relation:

$$\epsilon = 3\alpha - 2\delta \qquad (4)$$

When the relation (4) is lost, the principal optical axis $b$ cannot be perpendicular to the surface of emergence 6. This gives rise to the necessity that a prism for correcting the optical path length be additionally provided behind the surface of emergence 6.

Thus, according to the present invention, it is possible to provide a viewfinder which is readily convertible between an eye-level mode and a waist-level mode and vice-versa. The waist-level viewfinder of the prior art has presented horizontally inverted image, whereas the waist-level viewfinder of the present invention presents a horizontally normal image as does the eye-level viewfinder.

Although the dach surface 5 has been shown to be provided on the prism B, such surface may alternatively be formed on the prism A to obtain just the same result as described above. Further, the eyepiece C may desirably be arranged for rotation about the principal optical axis $a$ with the prism B.

I claim:

1. An eye-level and waist-level viewfinder comprising a pentagonal dach prism divided into a first and a second prism by providing a first and a second dividing surface between a first and a second reflecting surface of the pentagonal dach prism, said pentagonal dach prism satisfying the relations:

1. $\sin \alpha > 1/N$,
2. $\beta = 180° - 3\alpha/2$,
3. $\sin 2(\alpha - \delta) > 1/N'$,
4. $\epsilon = 3\alpha - 2\delta$, where $\alpha$ is the angle between the first dividing surface and the surface of incidence, $\beta$ the angle between the first reflecting surface and the surface of incidence, $\delta$ the angle between the second reflecting surface and the surface of incidence, $\epsilon$ the angle between the surface of emergence and the surface of incidence, and N and N' are the refractive indices of the first and second prisms, respectively, said second prism being rotatively displaceable through 180° substantially about a principal optical axis passing from the first prism to the second prism.

2. A viewfinder according to claim 1, wherein said dach surface is provided on said second prism.

3. A viewfinder according to claim 1, wherein said dach surface is provided on said first prism.

4. A viewfinder according to claim 1, further comprising an eyepiece disposed in opposed relationship with the surface of emergence of said pentagonal dach prism and rotatable about said principal optical axis with said second prism.

* * * * *